March 12, 1929. E. G. SCHLEICHER 1,705,210
LANDING GEAR
Filed June 7, 1927
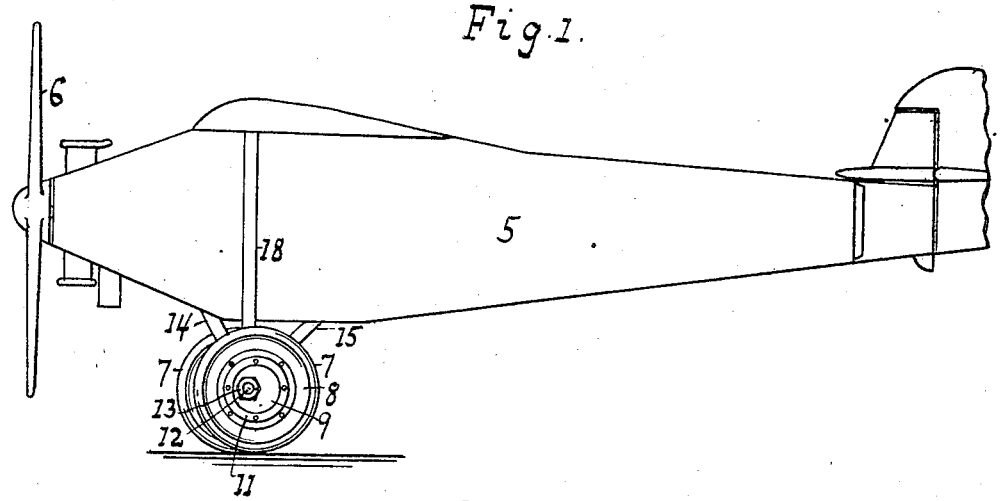
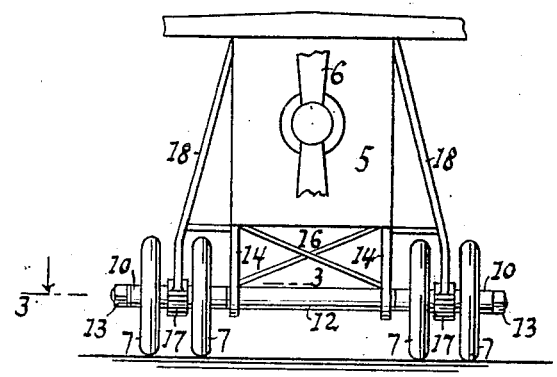
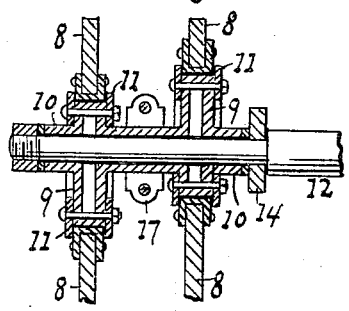
INVENTOR
Edward G. Schleicher
BY
Hauff Sbarland
ATTORNEYS Patented Mar. 12, 1929.

1,705,210

UNITED STATES PATENT OFFICE.

EDWARD G. SCHLEICHER, OF MOUNT VERNON, NEW YORK.

LANDING GEAR.

Application filed June 7, 1927. Serial No. 197,124.

This invention relates essentially to the landing gear of an aeroplane and it provides compensating and balancing devices which permits rising and landing with greater safety and ease.

An object of the invention is to mount the wheels eccentrically relative to a fixed stationary axle so as to cause an equal distribution of the weight, absorbing the shock when landing the aeroplane thus giving more perfect balance and greatly diminishing vibration.

Another object of the invention is to arrange the wheels in pairs each pair having a two throw crank so as to take up any depressions or ruts and ridges thereby increasing the rolling contact with the ground and transmitting more momentum to the aeroplane.

The invention resides more particularly in the novel combinations hereinafter described and claimed, reference being made to the accompanying drawing in which:

Fig. 1 represents a side elevation of an aeroplane embodying this invention.

Fig. 2 is a front elevation of the same.

Fig. 3 is a horizontal section taken along the line 3—3 of Fig. 2.

In the drawing the numeral 5 designates a fuselage and 6 is the propeller for driving the aeroplane forwardly as is well known. The landing gear of the aeroplane consists of four wheels each preferably provided with a pneumatic tire 7 for contact with the ground and having a web or spokes 8 fixed to the felly or rim and to the hub of the wheel as is well known. Each wheel is loosely mounted to revolve on a disk 9 fixed to or forming an integral part of the sleeve 10 as indicated in Fig. 3. Each sleeve carries two disks and the wheels are concentric relative to the periphery of the disks. The wheels are prevented from moving laterally by means of annular members 11 bolted to the disks.

There are two wheels arranged on each side below the fuselage and an axle 12 located transversely near the forward portion of the fuselage with end portions of smaller diameter serves to rockingly support the sleeves. The disks are mounted eccentrically on the axle and each disk is adapted to permit a wheel to rock over uneven ground while it concentrically revolves about a disk. The sleeves are prevented from sliding endwise off the axle by means of a nut 13 screwed on the end of the axle. In this arrangement the axle always remains stationary and the oscilllating movement of the eccentric is governed by the radius of the axis of the wheel from the center of the axle.

Each pair of the wheels are arranged eccentrically in this relation to the fulcrum or axle and one of a pair is always in advance of the other as shown in Fig. 1. When one or the other of the wheels while rolling along the ground strikes a rut the crank throw or rocking movement of the eccentric will permit the wheel to gravitate into the rut while the other wheel rolls either on a level or raised surface thereby balancing the fuselage.

The chassis for supporting the wheels includes, front struts 14 and rear struts 15 connected to the fuselage and the axle in the usual way. The struts are reinforced by wire cross-braces 16 extending from one to the other strut. The sleeves are journalled in bearings 17 having upwardly extending struts 18 fixed to the fuselage.

I claim:

1. In a landing gear for aeroplanes the combination with a stationary axle fixed to the fuselage of an aeroplane, of a sleeve eccentrically mounted to rock on the axle, and a plurality of wheels mounted to revolve on the sleeve.

2. In a landing gear for aeroplanes the combination with a stationary axle fixed to the fuselage of an aeroplane, of a pair of sleeves having disk members eccentrically mounted to oscillate on the axle, and a wheel rotatively mounted on each of the disks.

3. In a landing gear for aeroplanes the combination with a fuselage having front and rear strut members secured thereto, a stationary axle provided with reduced end portions fixed to the strut members of a sleeve having disk members eccentrically mounted to oscillate on each reduced end, and a wheel rotatively mounted on each of the disks.

4. In a landing gear for aeroplanes the combination with a fuselage having front and rear strut members secured thereto, a stationary axle provided with reduced end portions fixed to the strut members of a sleeve having pair of disk members eccentrically mounted to oscillate on each reduced end, and a pair of wheels one in advance of the other rotatively mounted on each pair of the disks.

5. In a landing gear for aeroplanes the combination with a fuselage having front and rear strut members secured thereto, a stationary axle provided with reduced end portions fixed to the strut members, of a sleeve having pair of disk members eccentrically mounted to oscillate on each reduced end, a pair of wheels one in advance of the other rotatively mounted on each pair of the disks, and annular members secured to the disk for preventing lateral movement of the wheel relative to the disk.

In testimony whereof I have hereunto set my hand.

EDWARD G. SCHLEICHER.